(12) United States Patent
Zahniser et al.

(10) Patent No.: US 7,561,329 B2
(45) Date of Patent: Jul. 14, 2009

(54) ILLUMINATION SOURCE FOR STAINED BIOLOGICAL SAMPLES

(75) Inventors: Michael Zahniser, Neeham, MA (US); David Zahniser, Wellesley, MA (US); Daniel Parsons, Woburn, MA (US)

(73) Assignee: Cytyc Corporation, Marlborough, MA (US)

( * ) Notice: Subject to any disclaimer, the term of this patent is extended or adjusted under 35 U.S.C. 154(b) by 15 days.

(21) Appl. No.: 11/611,123

(22) Filed: Dec. 14, 2006

(65) Prior Publication Data
US 2008/0144169 A1      Jun. 19, 2008

(51) Int. Cl.
G02B 21/06 (2006.01)
G02B 21/00 (2006.01)

(52) U.S. Cl. .................. 359/385; 359/368; 359/389
(58) Field of Classification Search .......... 359/368–390
See application file for complete search history.

(56) References Cited

U.S. PATENT DOCUMENTS

| | | | | | |
|---|---|---|---|---|---|
| 4,852,985 | A | * | 8/1989 | Fujihara et al. | ............. 359/387 |
| 5,291,195 | A | * | 3/1994 | Gross | ........................ 340/958 |
| 5,936,764 | A | * | 8/1999 | Kobayashi | ................. 359/385 |
| 6,150,774 | A | | 11/2000 | Mueller et al. | |
| 6,193,401 | B1 | | 2/2001 | Girkin et al. | |
| 6,305,818 | B1 | * | 10/2001 | Lebens et al. | ................ 362/184 |
| 6,659,578 | B2 | * | 12/2003 | Gudaitis et al. | ................ 347/3 |
| 6,665,060 | B1 | | 12/2003 | Zahniser et al. | |
| 6,683,419 | B2 | | 1/2004 | Kriparos et al. | |
| 6,806,659 | B1 | | 10/2004 | Mueller et al. | |
| 7,308,296 | B2 | | 12/2007 | Lys et al. | |
| 2003/0042493 | A1 | | 3/2003 | Kazakevich | |
| 2004/0190132 | A1 | | 9/2004 | Laschke et al. | |

(Continued)

FOREIGN PATENT DOCUMENTS

DE      34 18 839      * 11/1985

(Continued)

OTHER PUBLICATIONS

John Walsh, "The Microscope Lamp—Design Considerations for the Ideal Köhler Illuminator," Aug. 2003, 1 page, Micscape, Aug. 2003 URL: http://www.microscopy-uk-org.uk/mag/artaug03/jwled.html, downloaded on Apr. 29, 2008 (7 pages).

(Continued)

*Primary Examiner*—Thong Nguyen
(74) *Attorney, Agent, or Firm*—Vista IP Law Group LLP (57) ABSTRACT

A microscope illumination system includes a light source having at least four LED light sources, each LED source emitting light within a different portion of the visible spectrum. Each of the at least four LED light sources may be independently controllable. The resultant light emitted from the at least four LED sources substantially approximates that from an incandescent light source. In one embodiment, the system includes at least one red LED, at least one green LED, at least one blue LED, and at least one yellow LED. Other color combinations are also possible. The illumination may be positioned to place a sample holder such as a slide within the optical path of the light source. The system further includes an optical magnification system for magnifying an image of the biological sample. This may include a camera or traditional magnification optics.

16 Claims, 5 Drawing Sheets

U.S. PATENT DOCUMENTS

| | | |
|---|---|---|
| 2004/0263960 A1 | 12/2004 | Obuchi |
| 2005/0047172 A1* | 3/2005 | Sander ...................... 362/554 |
| 2007/0139638 A1* | 6/2007 | Wolpert et al. ................ 356/39 |

FOREIGN PATENT DOCUMENTS

| | | |
|---|---|---|
| DE | 3734691 | 4/1998 |
| DE | 19962779 A1 | 6/2001 |
| EP | 1150154 A1 | 10/2001 |
| EP | 1510847 A1 | 3/2005 |
| GB | 2348968 A | 10/2000 |
| WO | 03021329 | 3/2003 |

OTHER PUBLICATIONS

Tsunemasa Taguchi, "Light Gets Solid," Spie's oe magazine, Oct. 2003, (3 pages).

PCT International Search Report for PCT/US2007/086162, Applicant CYTYC Corp., Forms PCT/ISA/210 and 220 dated Mar. 12, 2008 (7 pages).

PCT Written Opinion of the International Search Authority for PCT/US2007/086162, Applicant CYTYC Corp., Form PCT/ISA/237, dated Mar. 12, 2008 (7 pages).

PCT International Search Report for PCT/US2006/061972, Applicant CYTYC Corp., Forms PCT/ISA/210 and 220 dated Dec. 6, 2007 (6 pages).

Written Opinion for PCT/US2006/061972, Applicant CYTYC Corp., Forms PCT/ISA/237 dated Dec. 6, 2007 (7 pages).

Prosecution History for U.S. Appl. No. 11/313,365: Non-Final Office Action dated Jan. 10, 2008 for U.S. Appl. No. 11/313,365 (7 pages) Amendment and Response dated Mar. 31, 2008 for U.S. Appl. No. 11/313,365 (15 pages) Notice of Allowance dated May 30, 2008 for U.S. Appl. No. 11/313,365 (7 pages).

* cited by examiner

ILLUMINATION SOURCE FOR STAINED BIOLOGICAL SAMPLES

STATEMENT REGARDING FEDERALLY SPONSORED RESEARCH OR DEVELOPMENT

This invention was made with Government support under grant number RR018046 awarded by the National Institutes of Health. The Government has certain rights in the invention.

FIELD OF THE INVENTION

The field of the invention generally relates to the field of cytology and histology. More specifically, the field of the invention relates to devices and methods for illuminating stained biological samples using one or more light emitting diodes (LEDs).

BACKGROUND OF THE INVENTION

Most microscopes use conventional incandescent lamps for illuminating stained biological samples. Incandescent lamps produce white light that is a combination of all colors in the visible spectrum (from about 400 nm to about 700 nm). Unfortunately, incandescent lamps produce considerable heat, have low energy efficiency, and must often be replaced frequently.

Light emitting diodes (LEDs) are known light sources that typically produce a single color, covering only a narrow band in the visible spectrum. For example, LEDs producing narrow bands of light centered on 450 nm, 525 nm, and 625 nm will appear to the human eye as blue, green, and red, respectively. Color is visualized by humans using specialized cells in the eye. In particular, the human eye contains three kinds of color receptor cells. These include so-called S-cones, M-cones, and L-cones, which sense Short, Medium, and Long wavelengths, respectively, of visible light. All three types of cone cells are sensitive to a wideband of wavelengths, but have different peak sensitivities. For example, S-cones are most sensitive around 420 nm (blue) while M-cones are sensitive around 534 nm (green), and L-cones are sensitive around 564 nm (red).

The eye essentially integrates the spectral function, producing three signals. One signal is the light intensity. Another differentiates blue light from yellow. Finally, the third separates yellow into red or green light. This integration of the spectrum averages colors together. Light from a yellow LED (590 nm) will appear the same to the eye as light from green and red LEDs combined (530 nm and 650 nm), because in both cases red and green are balanced and outweigh blue.

Combining different intensities of red, green, and blue light can create the appearance of nearly any color. For example, a microscope illumination system that uses separate colored red, green, and blue LEDs can be tuned to any color of illumination, depending on the operator's preferences.

In typical microscopic imaging applications, white light such as the light emitted from conventional incandescent bulbs is needed to illuminate the biological sample. Pathologists and others trained in viewing biological samples for disease states are familiar with analyzing samples illuminated with a broadband, incandescent light source. Attempts have been made to use LEDs to imitate the white light emitted from conventional incandescent sources. For example, single LEDs have been produced that generate a mixture of colored light to approximate white light. For example, in the aforementioned design, blue light is emitted from a gallium nitride diode semiconductor (at around 460 nm). Secondary light, in the range of about 550 nm to around 650 nm is emitted by a phosphor coating located inside a polymer jacket. The combination of wavelengths produces "white" light having a relatively high color temperature. A problem with LEDs of the type described above is that they are not good at producing light at relatively long wavelengths (e.g., red light).

In yet another design, light from red, green and blue LEDs is combined to produce illumination which appears to be white, but does not contain the full visible spectrum. In particular, the intensity of the illumination in the yellow band (around 565 nm to 590 nm) is very low. This gap in the yellow portion of the spectrum causes some stained cell samples to appear to be a different color than if they were illuminated with an incandescent lamp. This is problematic because the stained biological sample will appear different to a pathologist or other trained individual under the LED-based white light as compared to conventional incandescent white light. Pathologists, however, are typically trained on microscopes that use broad-band incandescent light sources. Different visual appearances may lead to confusion and misinterpretation of slide results. There thus is a need for an LED-based illumination source which produces little heat, has an extended lifetime, and produces colorimetric results similar to those of incandescent lamps.

SUMMARY OF THE INVENTION

In a first aspect of the invention, a microscope illumination system includes a light source having at least four LED light sources, each LED source emitting light within a different portion of the visible spectrum. Each of the at least four LED light sources may be independently controllable. The resultant light emitted from the at least four LED sources substantially approximates that from an incandescent light source. The at least four LED sources may be any color that, when combined, closely imitates light emitted from an incandescent or broadband light source. For instance, the at least four LEDs may include a red LED, a blue LED, a green LED, and a yellow LED. The illumination system may include a single LED of each color or, alternatively, the illumination system may include a plurality of LEDs of each color. In still another aspect, the illumination system may comprise a single red, green, and blue LED and multiple yellow LEDs. Still other color combinations are possible. For example, the four LED colors may include violet, cyan, yellow-green, and orange.

In one preferred aspect of the invention, the illumination system includes one or more driving circuits operably connected to the four colors of LEDs. For example, a first circuit may be used to drive the RGB colors while a second circuit may be used to drive the yellow LED. As another alternative, each color (red, green, blue, and yellow) may be controlled by individual circuits. In one aspect, the brightness of the individual colored LEDs can be independently controlled. The four colored LEDs may be separate or they be integrated into a single or multiple modules. For example, the RGB LEDs may be in one module while the yellow LEDs are located in a separate module.

In yet another aspect of the invention, a microscope illumination system includes a light source having at least one red LED, at least one green LED, at least one blue LED, and at least one yellow LED. The microscope illumination system includes a holder disposed within the optical path of the light source. The sample holder is configured to hold a biological sample within the optical illumination path. The microscope illumination system includes an optical system for obtaining magnified image(s) of the biological sample. For example, a camera may be used to acquire magnified images of the biological sample. Alternatively, conventional microscope optics can be employed (e.g., objective lenses and the like).

In still another embodiment of the invention, a method of illuminating a biological sample includes providing an illumination source having at least four LEDs with one LED being red, one being green, one being blue, and another being yellow. The yellow LED fills the gap in the yellow portion of the visible spectrum when compared against traditional RGB LED units. A biological sample, which may include a tissue section, cell, or multiple cells is then provided in the optical path of the illumination source. The biological sample, which is typically stained with a biological stain, is then illuminated with the at least four LEDs. The brightness of the various colored LEDs may be adjusted to alter the appearance of the image. For example, the brightness of the yellow LED(s) may be adjusted to alter the perceived hue.

DETAILED DESCRIPTION OF THE ILLUSTRATED EMBODIMENTS

Figure 1:
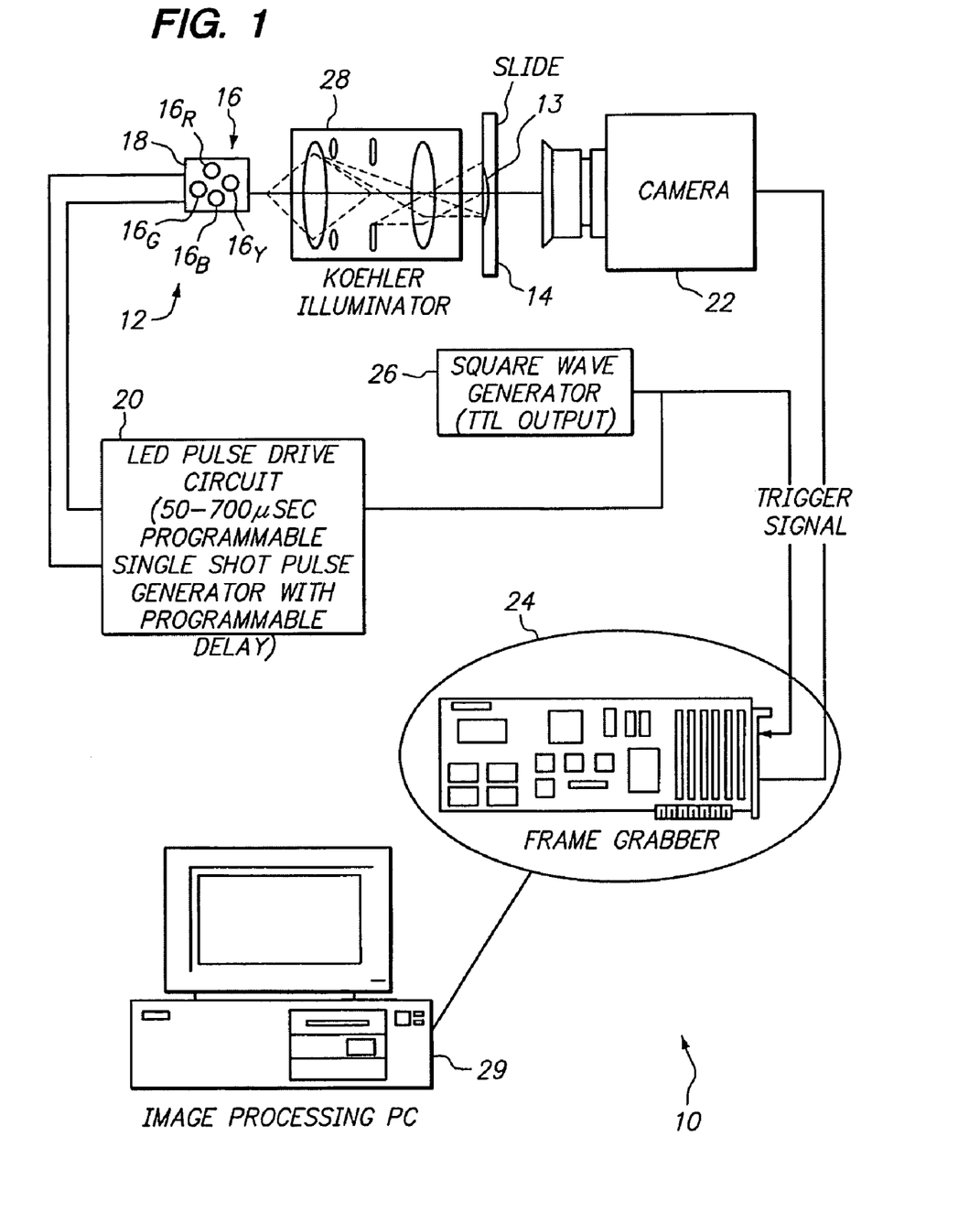
FIG. 1 schematically illustrates an LED-based illumination system according to one aspect of the invention.

FIG. 1 schematically illustrates a microscope illumination system 10. In a broad sense, the microscope illumination system 10 includes an illumination or light source 12 that includes at least four separate LEDs. The LEDs include at least one red LED, at least one green LED, at least one blue LED, and at least one yellow LED. The colors referenced above refer to the color of light emitted from the respective LED. For example, the red LED generally emits light within the range of about 625 nm to about 660 nm. The green LED generally emits light within the range of about 480 nm to about 575 nm. The blue LED generally emits light within the range of about 450 nm to about 500 nm. The yellow LED generally emits light within the range of about 575 nm to about 625 nm. Of course, these ranges are meant to encompass the bulk of light transmitted from each respective LED and some emissions beyond the stated range are expected to occur.

As explained in more detail below, the addition of the yellow LED fills a gap in the emission spectrum from the microscope illumination system 10 if just red, green, and blue LEDs were used as the illumination source. In this regard, the addition of the yellow LED allows the appearance of biological samples viewed under the LED-based microscope illumination system to more closely resemble the same samples viewed under the conventional incandescent system. In this regard, pathologists and other trained professionals are able to better visualize certain structures and aspects of the biological sample. For example, when certain stains such as Eosin Y and orange G stain are used, cells and cellular structures illuminated with only RGB (red, blue, green) light from LEDs appear visually different to a user compared to the same objects illuminated with a conventional broadband, incandescent light source. The addition of the yellow LED diminishes this problem.

Figure 2:
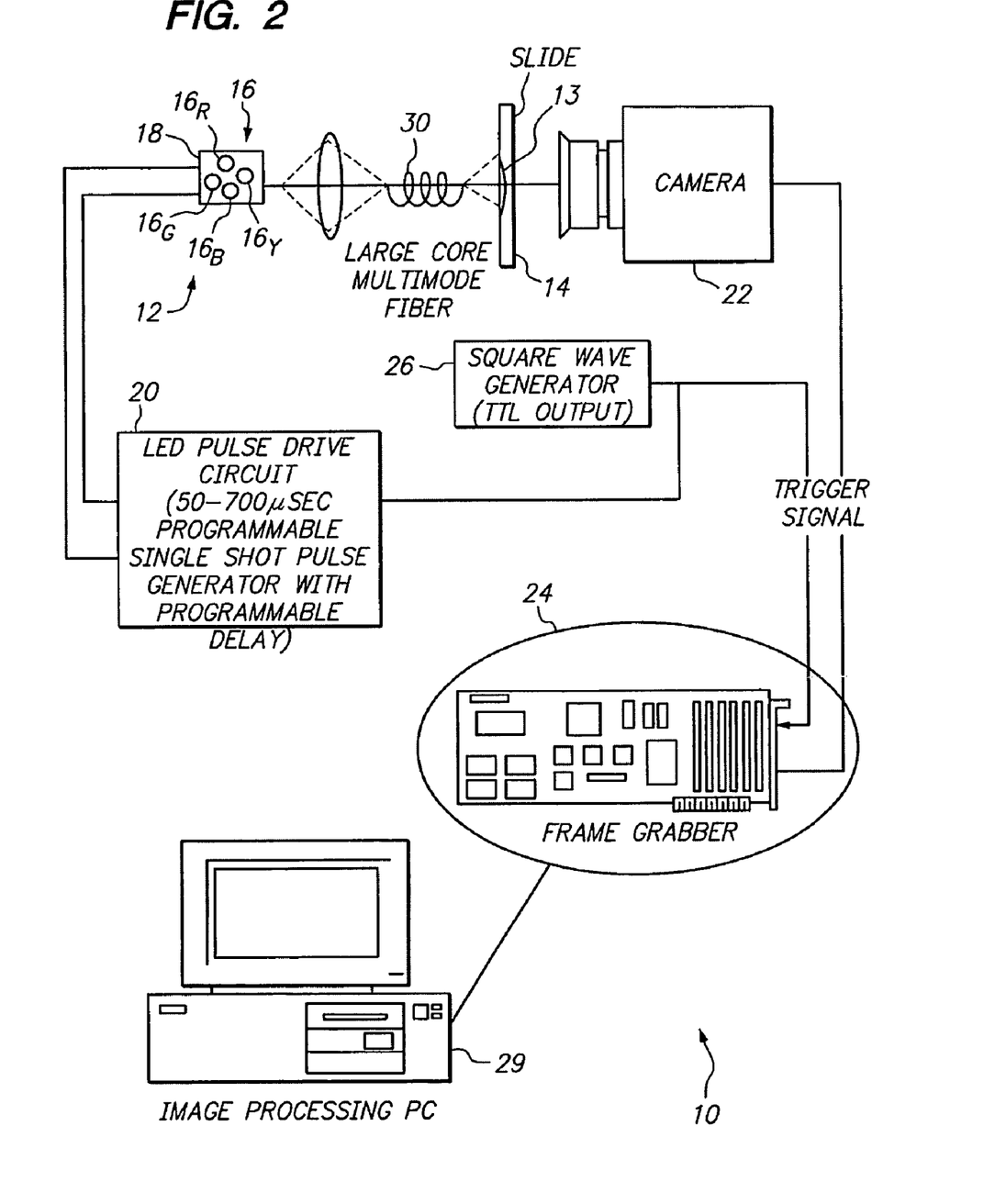
FIG. 2 schematically illustrates an LED-based illumination system according to another aspect of the invention.

Referring back to FIG. 1, one purpose of an microscope illumination system 10 is to provide a "white" light source for imaging a biological (e.g., cytological) specimen 13 on a microscope slide 14 using a plurality of different color LEDs 16. The illumination source includes at least one red LED $16_R$, at least one green LED $16_G$, at least one blue LED $16_B$, and at least one yellow LED $16_Y$. Each LED 16 may be a high brightness LED such that a bright, white light is able to illuminate the biological specimen 13 for visualization. The plurality of LEDs may be formed from a combination of single discrete LEDs, or custom multi-die LED-based module. For example, the individual LEDs may be assembled to form an illumination sub-assembly from off-the-shelf components. Alternatively, an LED-based module in which individual LED dies are mounted on a common substrate 18 (as shown in FIGS. 1 and 2) may be used.

LEDs 16 generate heat, and as the temperature of an LED increases, the output wavelengths shift. The amount of heat generated depends on the current at which the LED is driven and the duration of time for which the current is applied. To increase the light output from the device without producing enough heat to cause the wavelength to shift, the LEDs 16 may be driven with a pulse circuit 20 that, in certain embodiments, is synchronized with a camera 22 of the imaging system 10 to deliver short, intense pulses of light to the camera 22 during the camera integration period. In this embodiment, the camera 22 magnifies and captures images of the biological specimen 13 for subsequent viewing and/or analysis. Of course, the LEDs 16 do not have to be synchronized with the camera 22 if, for example, the microscope illumination system 10 was used by a human operator. In this embodiment, the camera 22 may be replaced with conventional magnification optics (e.g., objective lenses and the like). In this application, the LEDs 16 would be powered continually—there is no need for synchronization.

Referring back to FIG. 1, in the embodiment utilizing a camera 22, the LED pulse is synchronized with the camera frame integration by providing a external trigger that triggers both the camera/frame grabber 24 and the LED pulse driver 20, for example, using a square wave generator 26. The camera 22 does not respond instantaneously to the trigger. To compensate for this delay, the pulse drive circuit 20 has a programmable delay that is used to synchronize the systems. Of course, other synchronization methods are possible, depending on the camera type and actual implementation.

The illumination system 10 may include a processor 29 such as a personal computer that can be utilized to control the acquisition and storage of images taken via the camera 22. The processor 29 may coordinate various functions of the imaging sequence and also retain or transmit digital images of the biological specimens 12.

LEDs 16 inherently produce spatially non-uniform light output and some optical applications require reasonably uniform illumination of the sample. For situations where uniformity is an issue, two types of systems for generating spatially uniform illumination may be used with LEDs 16, namely, Koehler and fiber optic systems. The LEDs 16 used in either of these systems may be discrete LEDs 16 packaged in close proximity or multiple LED 16 dies may be integrated on a single substrate 18 to produce a more dense arrangement.

Koehler illumination (as seen in FIGS. 1 and 2) is a standard technique for producing uniform illumination of a microscope slide 14 from the spatially non-uniform filament of an incandescent lamp used in traditional microscope illuminators. As determined by testing, this technique is equally effective at achieving uniformity when employed with LEDs 16. In one embodiment of the LED-based illumination system 10, individual LEDs 16 are packaged closely together and placed in the general position of the lamp filament in the traditional Koehler illuminator 28.

In another embodiment for achieving uniformity, as seen in FIG. 2, multiple LEDs 16 are coupled into a large core (around 500 to 600 μm) optical fiber 30 with lenses or other optical apparatus. U.S. Pat. No. 6,665,060, which is incorporated by reference as if set forth fully herein discloses lenses that may be used with the LEDs 16. The length of the fiber 30 is selected so that the spatial non-uniformities of the LEDs 16 are mixed together and a relatively uniform spatial output from the fiber 30 is achieved. In practice, the output of the fiber 30 is approximately Gaussian in spatial profile. The fiber 30 may have to be displaced from the microscope slide 14, such that only the central, relatively flat, portion of the output is used. As an alternative to individual LEDs 16, multiple LED dies (such as that shown in FIGS. 1 and 2) may be placed on a single substrate 18. Individual lenses can be placed above each die so that the radiation from each die is collected into a narrow cone. In certain embodiments, the Koehler illuminator 28, 30 may be omitted entirely.

As explained above, the yellow LED $16_Y$ in FIGS. 1 and 2 fills a gap in the emission spectrum of emitted light using RGB LEDs $16_R$, $16_G$, $16_B$. The intensity of illumination in the yellow region of the spectrum (about 565 nm to about 590 nm) is filled by the presence of the at least one yellow LED $16_Y$. While FIGS. 1 and 2 illustrate a single yellow LED $16_Y$, in some embodiments multiple yellow LEDs $16_Y$ may be used. For example, in one configuration, a plurality of yellow LEDs $16_Y$ encircle or surround an interior portion that contains RGB LEDs $16_R$, $16_G$, $16_B$ or LED dies (see e.g., FIG. 4).

Figure 3:
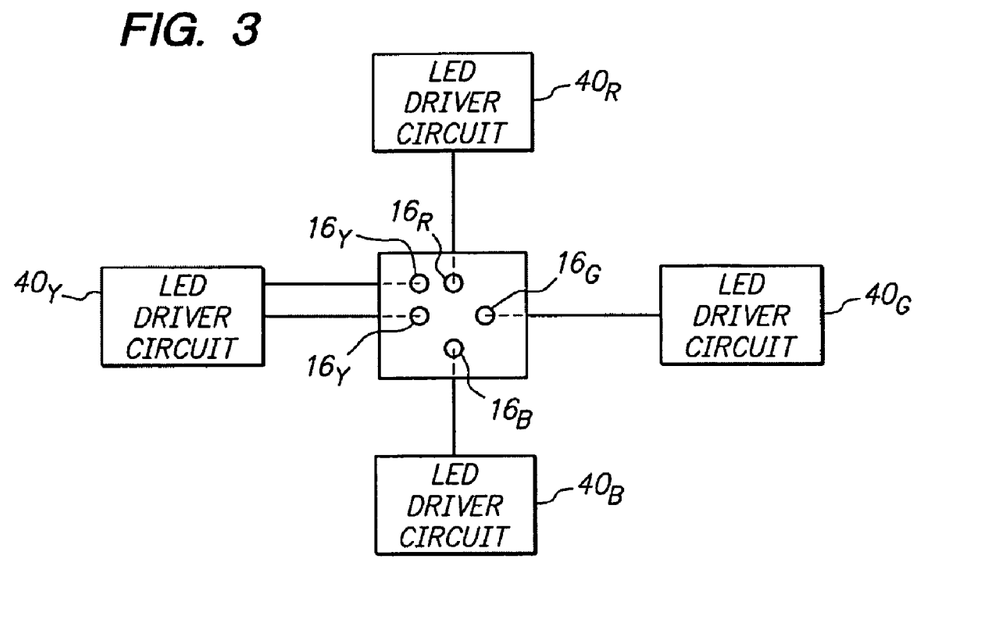
FIG. 3 illustrates an embodiment in which the four colored LEDs are each driven by a separate driving circuit.

In one aspect of the invention, as shown in FIG. 3, the plurality of LEDs $16_R$, $16_G$, $16_B$, and $16_Y$ are driven by separate driver circuits. That is to say, the at least one red LED $16_R$ is driven by a first driving circuit $40_R$, the at least one green LED $16_G$ is driven by a second, separate driving circuit $40_G$, the at least one blue LED $16_B$ is driven by a third, separate driving circuit $40_B$, and the at least one yellow LED $16_Y$ is driven by a fourth, separate driving circuit $40_Y$. FIG. 3 illustrates this embodiment wherein a separate driving circuit $40_R$, $40_G$, $40_B$, $40_Y$ is associated with each respective LED $16_R$, $16_G$, $16_B$, and $16_Y$.

The driving circuit $40_R$, $40_G$, $40_B$, $40_Y$ typically includes a current source for applying electrical current to the LEDs $16_R$, $16_G$, $16_B$, and $16_Y$. Light is emitted from the diode when the current is forward-biased across the LED p-n junction. The driving circuits $40_R$, $40_G$, $40_B$, $40_Y$ are capable of adjusting the brightness of each LED $16_R$, $16_G$, $16_B$, and $16_Y$ independently of one another. For example, the brightness of the yellow LED $16_Y$ may be adjusted independent of the red, green, and blue LEDs $16_R$, $16_G$, $16_B$. Brightness levels are adjusted using pulse width modulation. For example, to achieve a 10% brightness level, current is pulsed in an "on" state for 10% of the time and in an "off" state for 90% of the time. Pulse width modulation is a known method for controlling LED brightness levels. The driving circuits $40_R$, $40_G$, $40_B$, $40_Y$ may be implemented using one or more microprocessors.

Figure 4:
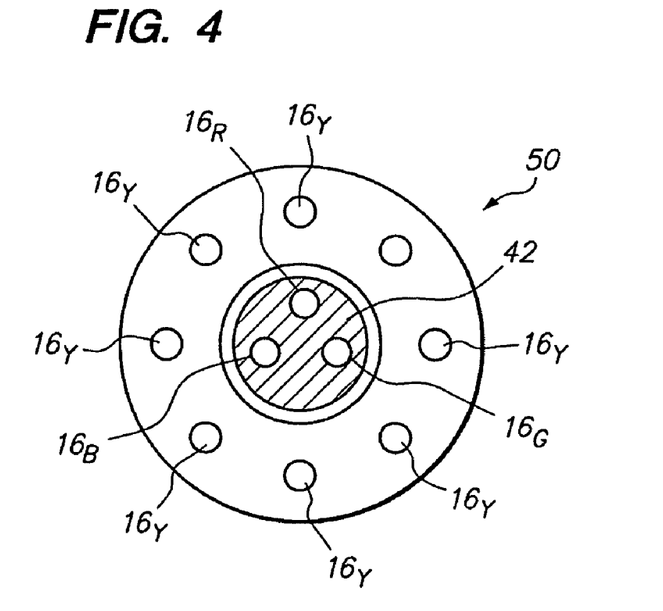
FIG. 4 illustrates an LED-based light source having a red LED, a green LED, a blue LED that is surrounded by a plurality of yellow LEDs.
Figure 5:
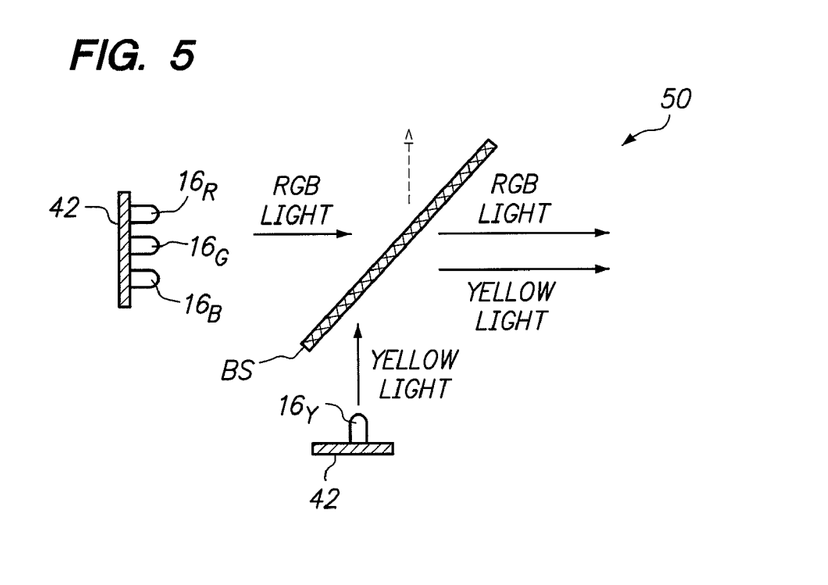
FIG. 5 illustrates another LED-based light source in which a first module contains red, green, and blue LEDs. A second module is provided that includes at least one yellow LED. The two modules are arranged with respect to a beam splitter such that the yellow light is combined with the red, green, and blue light to form white light for illuminating a sample.

FIGS. 4 and 5 illustrate two exemplary configurations for an LED-based light source 50 for the illumination system 10. In FIG. 4, a series of yellow LEDs $16_Y$ surround a LED module 42 having red, green, and blue LEDs $16_R$, $16_G$, $16_B$. The yellow LEDs $16_Y$ are arranged in a symmetrical manner about the LED module 42. FIG. 5 illustrates another configuration of an LED-based light source 50 in which a module 42 containing red, green, and blue LEDs $16_R$, $16_G$, $16_B$ emits radiation into a beam splitter BS. A separate module 42 containing a yellow LED $16_Y$ is positioned generally perpendicular to the optical path of the RGB module 42 such that the yellow light emitted from the yellow LED 16Y is combined or merged with the red, green, and blue light transmitted through the beam splitter. Of course, the LED-base light sources 50 of FIGS. 4 and 5 are illustrative and other configurations combining red, green, blue, and yellow LEDs $16_R$, $16_G$, $16_B$, and $16_Y$ are contemplated to fall within the scope of the invention.

Figure 6:
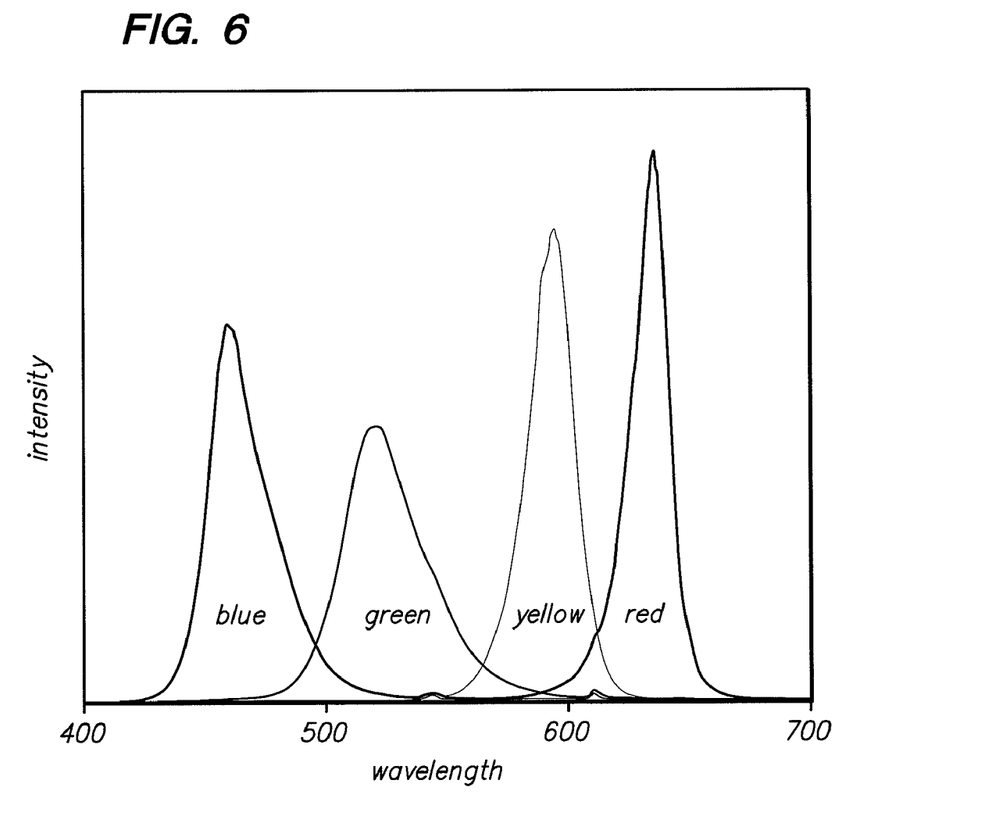
FIG. 6 illustrates a graph of light intensity as a function of wavelength for a four-color (red, green, blue, and yellow) LED-based illumination system.
Figure 7:
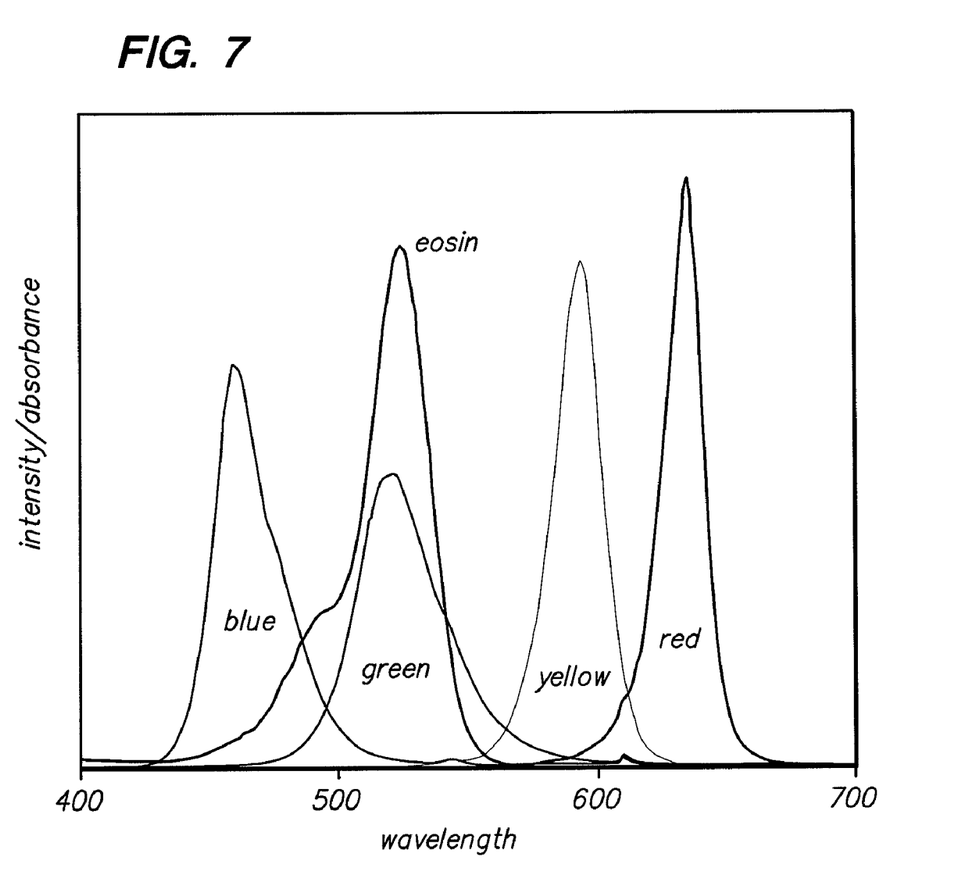
FIG. 7 illustrates a graph of light intensity as a function of wavelength for a four-color (red, green, blue, and yellow) LED-based illumination system. Also shown is the absorption spectrum of the stain Eosin Y.

The presence of the yellow LED $16_Y$ fills the gap in this region of the visible spectrum (about 565 nm to about 590 nm). FIG. 6 illustrates the spectrum of an illumination system 10 that uses red, green, blue, and yellow LEDs $16_R$, $16_G$, $16_B$, and $16_Y$. The addition of this fourth (i.e., yellow) color makes stained biological samples (e.g., cells) appear to be much closer to the colors perceived if the samples were illuminated with a broadband, incandescent light source. For example, the invention is of particular interest for stained biological samples that use biological stains such as Eosin Y ($C_{20}H_6Br_4Na_2O_5$; CAS No. 17372-87-1), a common counter-stain to alum hematoxylin in the Hematoxylin and Eosin (H&E) method. Eosin Y absorbs a narrow band of light, with an absorption peak at around 525 nm. This absorption peak corresponds, almost exactly, with the peak emission wavelength of the green LED $16_G$. FIG. 7 illustrates the absorption spectrum for Eosin Y superimposed on the illumination spectra for the four color LEDs $16_R$, $16_G$, $16_B$, and $16_Y$ (FIG. 6). Note that for a sample stained with Eosin Y, most of the green light is blocked while the blue, yellow and red wavelengths are transmitted.

If a biological sample stained with Eosin Y is illuminated with an incandescent source, most of the green light is blocked, and the remaining spectrum is perceived by the human eye as a light pink color. However, if a biological sample stained with Eosin Y is illuminated using only red, green and blue LEDs $16_R$, $16_G$, $16_B$, the absence of the yellow wavelengths causes a considerable shift in the perceived color of the biological sample. As with the incandescent source, most of the green light is blocked, and the remaining mixture of red and blue is perceived by the human eye as a highly saturated shade of magenta. Consequently, thick clusters of cells stained with Eosin Y appear so dark and saturated that it is difficult to identify the nuclei. A pathologist or cytotechnologists thus sees a very different image from what he or she expects to see under traditional incandescent illumination.

Similar color perceptions may occur in biological specimens stained with Orange G stain (1-Phenylazo-2-naphthol-6,8-disulfonic acid disodium salt; $C_{16}H_{10}N_2Na_2O_7S_2$, CAS No. 1936-15-8). If an LED-based illumination system having only red, blue, and green LEDs is used to illuminate a biological sample for viewing, it is difficult to distinguish the Orange G stain from Eosin Y. This is problematic, however, because Orange G stain is an indicator of keratinizing cancer. There thus exists the possibility for misdiagnosis in illumination systems that only rely on RGB colors.

Because cell staining provides diagnostic information, it is imperative for LED-illuminated biological structures (e.g., cells and cellular organelles) to appear the same as those illuminated with incandescent light sources typically used in microscopes. If only RGB LEDs were used to illuminate cells, it is possible that a sample may be misdiagnosed by a pathologist or cytotechnologist because of the different appearances.

This problem is solved, however, if a yellow LED $16_Y$ is added and the relative intensities of the LEDs $16_R$, $16_G$, $16_B$, and $16_Y$ are adjusted so that the light still appears white. Consequently, a sample stained with Eosin Y will be perceived or visualized having the expected pinkish tone rather than the dark magenta coloring. As with the incandescent light source, most of the green light from the LED $16_G$ is blocked, and the remaining mixture of red, blue and yellow light is perceived by the human eye as a light pink color. The perceived hue can be adjusted by varying the brightness of the yellow light to match the appearance of the incandescent illumination. For example, with reference to FIG. 3, the LED driver circuit $40_Y$ may be used to alter the brightness of the yellow LED $16_Y$ by adjusting the pulse width modulation.

The improved white illumination can be achieved by building an LED module 42 that incorporates one or more yellow LEDs $16_Y$ in addition to one or more of the conventional red, green and blue LEDs $16_R$, $16_G$, $16_B$. Alternatively, multiple LED modules 42 may be combined to imitate a broadband, incandescent light source. While the invention described herein has been described using a four colors of LEDs (red, green, blue, and yellow), similar results could be achieved by any combination of colors of LEDs that covers enough of the visible spectrum. For example, a combination of violet, cyan, yellow-green, and orange LEDs would provide a spectrum just as full as that created by red, green, blue, and yellow LEDs. Inclusion of additional colors of LEDs in an illumination system 10 of the type described herein may be able to provide a more complete, fuller spectrum that emulates the spectrum emitted from incandescent radiation.

While embodiments of the present invention have been shown and described, various modifications may be made without departing from the scope of the present invention. The invention, therefore, should not be limited, except to the following claims, and their equivalents.

What is claimed is:

1. An illumination system for stained biological specimens comprising:
   an illumination source comprising a red LED light source, a green LED light source, a blue LED light source, and a plurality of yellow LED light sources arranged symmetrically in a ring around the red LED light source, the green LED light source, and the blue LED light source, each of the red LED light source, the green LED light source, the blue LED light source, and the plurality of yellow LED light sources being independently controllable, wherein the resultant light emitted from the red LED light source, the green LED light source, the blue LED light source, and the plurality of yellow LED light sources substantially approximates that from an incandescent light source, the illumination source configured to illuminate a biological specimen disposed on a slide;
   an imaging system comprising a camera configured to capture images of the biological specimen; and
   a pulse drive circuit configured to simultaneously drive the red LED light source, the green LED light source, the blue LED light source, and the plurality of yellow LED light sources in a pulsed manner, wherein the pulsed LED light is synchronized with the camera, the pulse drive circuit configured to alter the brightness of the red LED light source, the green LED light source, the blue LED light source, and the plurality of yellow LED light sources by pulse width modulation.

2. The illumination system of claim 1, wherein the red LED light source, the green LED light source, the blue LED light source, and the plurality of yellow LED light sources are coupled to separate driver circuitries for adjusting the respective brightness of each color.

3. The illumination system of claim 1, wherein the red LED light source emits light within the range of about 625 nm to about 660 nm.

4. The illumination system of claim 1, wherein the blue LED light source emits light within the range of about 450 nm to about 500 nm.

5. The illumination system of claim 1, wherein the green LED light source emits light within the range of about 480 nm to about 575 nm.

6. The illumination system of claim 1, wherein the plurality of yellow LED light sources emit light within the range of about 575 nm to about 625 nm.

7. The illumination system of claim 1, wherein the red LED light source, the green LED light source, and the blue LED light source are contained in a first module and the plurality of yellow LED light sources is contained in a second module.

8. A microscope illumination system comprising:
   a light source comprising at least one red LED, at least one green LED, at least one blue LED, and a plurality of yellow LEDs surrounding in a symmetrical manner the at least one red LED, at least one green LED, at least one blue LED;
   a sample holder disposed within the optical path of the light source, the sample holder configured to hold a microscope slide containing a biological sample;
   a camera configured for magnifying an image of the biological sample;
   a LED pulse drive circuit configured to simultaneously drive the at least one red LED, at least one green LED, at least one blue LED, and the plurality of yellow LEDs, the LED pulse drive circuit further configured to alter the brightness of the plurality of yellow LEDs by pulse width modulation; and
   an external trigger configured to trigger the LED pulse drive circuit and the camera in a synchronized, pulsed manner.

9. The microscope illumination system according to claim 8, wherein the at least one red LED, at least one green LED, at least one blue LED, and the plurality of yellow LEDs are mounted on a common substrate.

10. The microscope illumination system according to claim 8, further comprising control circuitry for modifying the brightness of the plurality of yellow LEDs with respect to the at least one red LED, the at least one green LED, and the at least one blue LED.

11. The microscope illumination system according to claim 8, wherein the at least one red LED emits light within the range of about 625 nm to about 660 nm.

12. The microscope illumination system of claim 8, wherein the at least one blue LED emits light within the range of about 450 nm to about 500 nm.

13. The microscope illumination system of claim 8, wherein the at least one green LED emits light within the range of about 480 nm to about 575 nm.

14. The microscope illumination system of claim 8, wherein the at plurality of yellow LEDs emit light within the range of about 575 nm to about 625 nm.

15. A method of illuminating a biological sample disposed on a microscope slide comprising:
- providing an illumination source including at least one red LED, at least one green LED, at least one blue LED, and a plurality of yellow LEDs arranged in a ring surrounding the at least one red LED, the at least one green LED, and the at least one blue LED;
- providing the biological sample disposed on the microscope slide in the optical path of the illumination source;
- providing an imaging system comprising a camera configured to acquire image frames of the biological sample disposed on the microscope slide;
- illuminating the biological sample with the at least one red LED, the at least one green LED, the at least one blue LED, and the plurality of yellow LEDs simultaneously in a pulsed mode;
- obtaining images of the biological sample disposed on the microscope slide with the camera, wherein the pulsing of the at least one red LED, the at least one green LED, the at least one blue LED, and the plurality of yellow LEDs is synchronized with the camera; and
- adjusting the brightness of the plurality of yellow LEDs by altering the pulse width modulation of the plurality of yellow LEDs.

16. The method of claim 15, wherein the brightness of the plurality of yellow LEDs is adjusted relative to the remaining LEDs.

* * * * *